Feb. 10, 1931. E. STICH 1,792,450
PROCESS AND APPLIANCE FOR FERMENTING SACCHARIFEROUS LIQUIDS
Filed Sept. 23, 1929
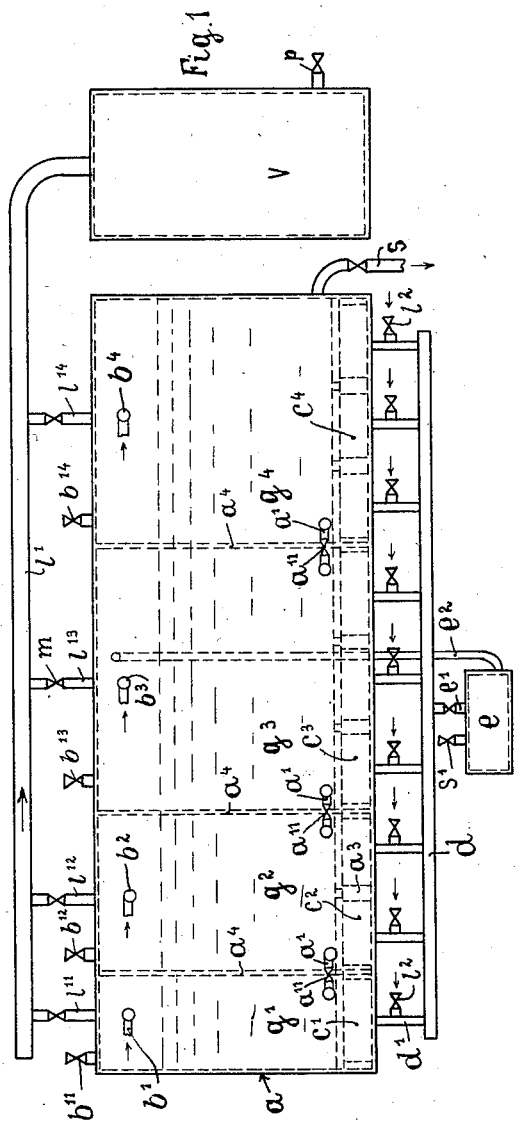
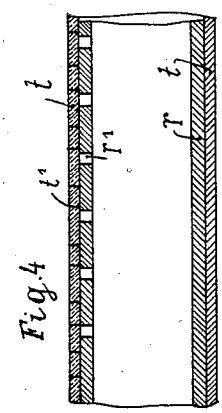
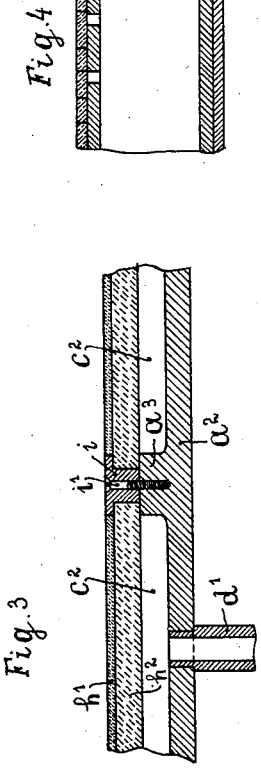
Inventor
Eugen Stich
by
Attorney Patented Feb. 10, 1931

1,792,450

UNITED STATES PATENT OFFICE

EUGEN STICH, OF MANNHEIM, GERMANY

PROCESS AND APPLIANCE FOR FERMENTING SACCHARIFEROUS LIQUIDS

Application filed September 23, 1929, Serial No. 394,659, and in Germany October 24, 1927.

My invention has for its object a process and an appliance for fermenting sacchariferous liquids, the technical and economical effect obtained by the invention consisting in an increase of the output of yeast and spirit, in a notable reduction of the consumption of power and time required for carrying out the fermentation process, and in the fact that any infection of the liquid to be fermented is prevented.

According the conditions nowadays prevailing in the art 80 to 100 cbm. of air are required for 1 cbm. of mash per hour. With the normal dimensions of the usual tubs having a capacity of 100 to 150 cbm., this corresponds to an amount of air varying between 10,000 to 15,000 cbm. of air. The perception that this large amount of air is due to the insufficient utilization and distribution of the air has already led to the employment of porous clay floors or finely perforated rubber plates, to obtain a better decomposition and more uniform distribution of the air. It has been found, however, in practice that these distributing means form infection centers and the desired degree of fineness of the decomposition of the air and a uniform distribution thereof has not been attained.

I have found by exhaustive tests that the above advantageous conditions can be obtained without any disadvantage by employing diaphragm plates of the type used for electrolytic purposes which plates have pores of a diameter of 0.16 to 6 $\mu$. Diaphragm plates of this pore diameter cause the finest possible dust-like distribution of the air. Further, they do not become slimy even in long service and remain free of any infection.

I have further found that diaphragm plates of this type when of a thickness required in practice offer a too great a resistance to the passage of the air. Consequently I subdivide the diaphragm plates so as to form two layers the upper layer which is in immediate contact with the liquid to be fermented having pores of the above very fine diameter whilst the lower layer has greater pores. These plates are made of a sufficient thickness, more particularly those forming the coarser layer, so that the lower layer possesses a far lower resistance to the passage of the air whilst at the same time the desired security against infection is attained as well as the above-mentioned very fine distribution of the air.

My tests have proved that with a tenth of the quantity of air hitherto required much higher outputs of spirit and yeast are obtained. This result is obtained also by employing in those fermentation processes by which both spirit and yeast are gained simultaneously and which therefore require little oxygen only, radiation pipes having elastic envelopes e. g. of rubber, in place of the described plates. I provide the rubber envelopes on their upper side with fine pricks made by means of needles which pricks open only under the air pressure so as to act as valves which on the one hand results in the formation of very fine air bubbles and on the other hand protects the system of radiation pipes from any entrance of the mash thereabove when the air supply has been cut off.

Furthermore, I attain according to my invention a further reduction of the air consumption by subdividing into several small tubs the very big tubs hitherto used and forming one sole container. I determine further this subdivision or the capacity of the part tubs so as to correspond to the propagation of the yeast and to the supply of nutritious solution required therefor, in equal periods of time. I attain by this arrangement that the fermented mash can be drawn off from the last part tub at short intervals of time which correspond to the number of the part tubs. So for instance, when drawing off the mash hourly, 60 percent of tub volume can be saved so that in place of one tub of a capacity of 100 cbm. the content of which is fermented twice within 24 hours, a system of part tubs of a total capacity of 40 cbm. can be employed. To easily convey the mash from the one part tub to the other, I have found the production of a vacuum to be of particular advantage. This vacuum is further used to cause a ventilation of the tubs. I attain a very satisfactory uniform ventilation of the entire floor of each part tub by subdividing the air feeding floor by means of the above diaphragm plates into individual compartments which are air-tightly shut off from one another, the air supply to these compartments being controlled by regulating valves. To allow for eventual leakage of the floors, I connect the lower ends of the pipes supplying air to the individual compartments of the air feeding floors to a collector from which the leakage mash is led to the tubs.

In order that my invention can be more easily understood as to both its general arrangement and details, a preferred embodiment of the same is illustrated by way of example in the drawing which accompanies and forms part of the present specification. In this drawing Figure 1 is a diagrammatic side view of a fermentation plant designed according to my invention, whilst Figures 2 to 4 show details thereof in section and on an enlarged scale.

Referring to these figures, $a$ is a tank in which are lodged four part tubs $g^1$, $g^2$, $g^3$, $g^4$ separated from one another by partitions $a^4$. $v$ denotes a vacuum vessel which is connected to a suitable vacuum pump by a pipe $p$. Through a common pipe $l^1$ and branches $l^{11}$, $l^{12}$, $l^{13}$, $l^{14}$ the vacuum vessel $v$ communicates with the individual part tubs. In each of these branch pipes is provided a valve $m$. The part tubs are connected by separate pipes $b^1$ to $b^4$ to a vessel (not shown) which contains a nutritious solution and are fitted further with cocks or valves $b^{11}$ to $b^{14}$. Each of the part tubs $g^1$ to $g^4$ is connected to the neighboring one by a pipe $a^1$, a valve $a^{11}$ being provided in each of these pipes.

On the bottom of each part tub is provided the above-mentioned air feeding floor $c^1$ to $c^4$. These floors consist of simple diaphragm plates $h$ having a pore diameter of 0.1 to 6$\mu$ and are arranged at a certain distance from the bottom $a^2$ of the tank $a$, or better of compound plates $h^1$, $h^2$ as shown in Figure 3, the pores of the upper layer $h^1$ have the above set forth small diameter while the lower layer $h^2$ has pores of larger diameter.

When using tubs of large size, they are equipped with air feeding floors composed of individual diaphragm elements supported by ribs $a^3$, see Figure 3, of the bottom $a^2$ of the tank and separated from one another water-tightly by cross bars $i$ and fastening screws $i^1$. Branch pipes $d^1$ open into the individual air feeding floors and their compartments which branch pipes by separate pipes $l^2$ that comprise valves are in connection with an air vessel (not shown) wherein atmospheric pressure or pressure below atmospheric prevails. All branch pipes $l^2$ are connected to a collecting pipe $d$ which leads the dropping liquid collected in the individual air feeding floors and their compartments through a branch pipe $e^1$ to a collecting vessel $e$. From the latter this liquid is conveyed to one of the part tubs, e. g. to tub $g^3$ of the embodiment shown, by an ascension pipe $e^2$.

The fermentation process takes place in the following manner:

Through pipe $b^1$ tub $g^1$ is filled first while valve $b^{11}$ is closed and the suction pipe $l^{11}$ is open. After the fermentation has taken place within about 1 to 1¾ hours, the whole content of tub $g^1$ is conveyed to tub $g^2$ through the respective pipe $a^1$ by connecting the branch pipe $l^{12}$ to the suction pipe $l^1$, whereupon tub $g^1$ is filled anew through pipe $b^1$ with nutritious solution and starting yeast. In tub $g^2$ then takes place the propagation of the first yeast by double its quantity and the whole content of tub $g^2$ is then conveyed in the described manner to tub $g^3$ through pipe $a^1$. In tub $g^3$ the yeast doubles again within about 1½ hours. Thereupon the content of tub $g^3$ is conveyed to tub $g^4$ through pipe $a^1$ while suction pipe $l^{14}$ is open, the liquid ripening now in tub $g^4$ a small quantity of nutritious solution being added to this end. This ripening stage lasts likewise about 1½ hour. After the content of tub $g^4$ has been drawn off into a collecting vessel (not shown) through a drain pipe $s$, tub $g^4$ is refilled with the fermented content of tub $g^3$ and so on, so that the entire operation constitutes a continuous fermentation process. When the content of the collecting vessel $e$ should be raised to tub $g^3$, branch pipe $e^1$ is shut off from the collecting pipe $d$ and valve $s^1$ is opened so that the liquid is pressed through ascension pipe $e^2$ by the pressure of the outer air into tub $g^3$ wherein pressure below atmospheric prevails.

In place of the diaphragm plates described radiation pipes $r$, see Figure 4, may be arranged in each part tub which pipes are enclosed in rubber hoses $t$ and on their upper side are provided with openings $r^1$. The rubber envelopes $t$ on their upper side possess fine holes $t^1$ applied by means of needles or the like.

By the introduction of the very fine air bubbles in the liquid the latter very soon is converted to froth that in its turn consists of very fine bubbles, a further supply of air to this frothy liquid thus being necessary only to a very slight extent or only from time to time. The yeast will grow particularly quickly and powerfully within the pellicles of the froth bubbles as it always has at its disposal the oxygen required for its growth. This phenomenon leads to another modification of my invention namely to convert fermenting liquid to froth of fine bubbles by supplying very fine air bubbles, in which froth the yeast then grows without any notable further supply of air. Furthermore, if required, froth-forming and froth-maintaining substances such as glucoside, saponine or the like may be added to the liquid. A slight supply of air will be required only to further maintain the froth and to separate the carbonic acid formed by the fermentation.

What I claim and desire to secure by Letters Patent is:—

1. In fermenting sacchariferous liquids feeding air thereto through diaphragm plates having a pore diameter of 0.16 to $6\mu$ whereby infection of the liquid is prevented.

2. In fermenting sacchariferous liquids, feeding air thereto through diaphragm plates formed by two superposed layers, the upper one of which is in contact with the liquid while the lower layer forms a fore-layer, said upper layer having pores of a diameter of 0.16 to $6\mu$, while the lower layer has pores of larger diameter.

3. In fermenting sacchariferous liquids, feeding air thereto in a finely distributed state through diaphragm plates having a pore diameter of 0.16 to $6\mu$ at such a rate that the liquid becomes frothy.

4. In fermenting sacchariferous liquids, feeding air thereto in a finely distributed state through diaphragm plates having a pore diameter not exceeding $6\mu$, so that the entire liquid is converted to froth, reducing the supply of air so that the froth again becomes liquid, and converting the latter anew to froth.

5. In fermenting sacchariferous liquids, feeding air thereto in a finely distributed state through diaphragm plates having pores not exceeding in diameter $6\mu$, whereby the liquid is converted to froth, and adding thereto material for favoring the formation of froth.

6. A fermentation plant comprising a fermenting tub the bottom of which consists of diaphragm plates of a material as used in electrolytic cells, and means for feeding to and draining from said tub the liquid to be fermented.

7. A fermentation plant comprising a fermenting tub the bottom of which consists of two superposed layers of diaphragm plates of a material as used in electrolytic cells, the upper layer being in contact with the liquid to be fermented and having a pore diameter not exceeding $6\mu$, whilst the lower layer has pores of larger diameter.

8. A fermentation plant comprising a plurality of closed fermenting tubs, a floor arranged in each of said tubs at a distance from the bottom thereof and consisting of diaphragm plates having a pore diameter not exceeding $6\mu$, air feeding pipes leading to the space existing between the bottom and floor of said tubs, suction pipes leading away from said tubs above the liquid therein, fresh air feeding pipes opening into said tubs above the liquid therein, pipes connecting each two subsequent ones of said tubs and adapted to consecutively convey the liquid from one to the next tub, and a means for producing a vacuum connected to said suction pipes.

9. A fermentation plant comprising a plurality of closed fermenting tubs consecutively increasing in volume, a floor arranged in each of said tubs at a distance from the bottom thereof and consisting of diaphragm plates having a pore diameter not exceeding $6\mu$, air feeding pipes leading to the space existing between the bottom and floor of said tubs, drain pipes in communication with said space, means for conveying the liquid drained by said latter pipes to one of said tubs, suction pipes leading away from said tubs above the liquid therein, means for producing a vacuum connected to said suction pipes, valve-fitted fresh air feeding pipes opening into said tubs above the liquid therein, pipes for feeding liquid to be fermented to said tubs, and pipes connecting each two subsequent ones of said tubs and adapted to consecutively convey the liquid from one to the next tub.

10. A fermentation plant comprising a plurality of closed fermenting tubs consecutively increasing in volume, perforated radiation pipes arranged on the bottom of said tubs, elastic envelopes on said radiation pipes having fine holes, means for feeding air to said pipes, means for producing a vacuum in said tubs above the liquid to be fermented therein, valve-fitted pipes connecting each two subsequent ones of said tubs and adapted to consecutively convey the liquid from one to the next tub, and means for feeding liquid to the individual tubs.

11. A fermentation tub having an air feeding floor composed of a plurality of diaphragm plates of a pore diameter not exceeding $6\mu$ and arranged at a distance from the bottom of said tub so as to form with said bottom a distributing chamber for the air to be fed, ribs on said bottom supporting said plates, and means for water-tightly fixing said plates on said ribs and for water-tightly separating them from one another.

12. A fermentation tub having an air feeding floor composed of a plurality of diaphragm plates of a pore diameter not exceeding $6\mu$ and arranged at a distance from the bottom of said tub so as to form with said bottom a distributing chamber for the air to be fed, means for feeding air to said chamber, ribs on said bottom supporting said plates, and means for water-tightly fixing said plates on said ribs and for water-tightly separating them from one another.

13. As a new article of manufacture, a fermentation system having a diaphragm plate intended to be used for feeding air to sacchariferous liquids to be fermented and consisting of porous material having a pore diameter of 0.16 to $6\mu$.

14. As a new article of manufacture, a fermentation system having a diaphragm plate intended to be used for feeding air to sacchariferous liquids to be fermented, and consisting of a material as used in electrolytic cells and having a pore diameter of 0.16 to 6μ.

15. As a new article of manufacture, a fermentation system having a diaphragm plate intended to be used for feeding air to sacchariferous liquids to be fermented, and consisting of two layers of porous material one of which has a pore diameter of 0.16 to 6μ while the other layer has pores of larger diameter.

16. In fermenting sacchariferous liquids, the steps of subdividing the liquid into a plurality of separate quantities corresponding in volume to the propagation of yeast desired and the supply of nutritious solution required therefor in determined equal periods of time, feeding air into each quantity simultaneously through diaphragm plates having pores not exceeding in diameter 6μ, and withdrawing and replacing each quantity of liquid so as to keep the volume constant.

17. In fermenting sacchariferous liquids, the steps of subdividing the liquid into a plurality of separate quantities corresponding in volume to the propagation of yeast desired and the supply of nutritious solution required therefor in determined equal periods of time, feeding air into each quantity simultaneously through diaphragm plates having pores not exceeding in diameter 6μ, and withdrawing and replacing by a vacuum effect each quantity of liquid so as to keep the volume constant.

In testimony whereof I affix my signature.

EUGEN STICH.